United States Patent Office 3,007,963
Patented Nov. 7, 1961

3,007,963
METHOD OF MAKING 2,2'-DIPHENIC ACID
Robert H. Callighan, Pittsburgh, Pa., assignor to United States Steel Corporation, a corporation of New Jersey
No Drawing. Filed June 4, 1959, Ser. No. 818,014
1 Claim. (Cl. 260—523)

This invention relates to a method of making 2,2'-diphenic acid and, in particular, to a method of converting 2,2'-biphenyldicarboxaldehyde by an ozone-catalyzed oxidation.

Known methods for the production of diphenic acid are complex or expensive. The use of the product has been limited accordingly although it is desirable for numerous commercial products such as resins and alkyd films. I have invented a novel process for making diphenic acid with good yield at low cost from a starting material which is readily available or may be easily made from inexpensive source material.

In general, my method comprises the ozone-catalyzed oxidation of 2,2'-biphenyldicarboxaldehyde dissolved in an organic solvent at room temperature, while in contact with a mildly alkaline aqueous solution. It appears to be necessary for satisfactory results, that the oxidation be effected in a two-phase mixture, i.e., an organic solvent for the dialdehyde, such as carbon tetrachloride, and a water solution of a mildly alkaline salt such as sodium or potassium carbonate. It is theorized that the formation of diphenic acid occurs in a stepwise manner, through the formation of intermediate products. Specifically, it appears that, during the oxidation, 2,2'-biphenyldicarboxaldehyde is converted into a mixture of permonodiphenic acid and diphenic acid. These acids dissolve in the sodium carbonate layer through the formation of a sodium salt. Under the mild alkaline conditions prevailing in the aqueous layer, the sodium salt of permonodiphenic acid is converted into the sodium salt of diphenic acid with the formation of hydrogen peroxide. The reaction may be represented schematically as follows:

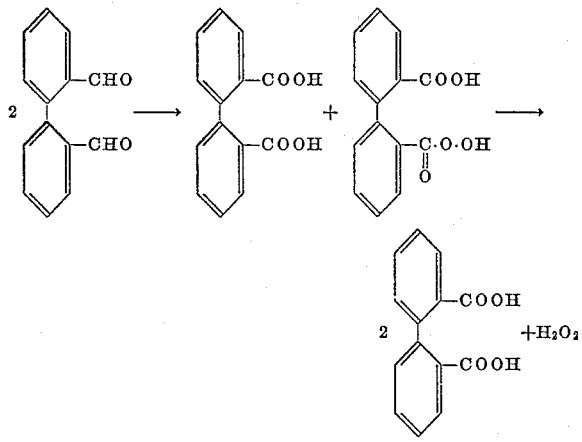

At elevated temperatures such as 70° C. the permonodiphenic acid appears to decompose, with the elimination of carbon dioxide, and form 2,2'-biphenyl lactone instead of the desired diphenic acid. It was entirely unexpected that the oxidation in a two-phase system at room temperature eliminated the formation of the lactone and gave a high yield of diphenic acid.

A complete understanding of the invention may be obtained from the following detailed explanation of several typical examples of the practice thereof.

*Example I*

10.5 grams (0.05 mole) of 2,2'-biphenyldicarboxaldehyde was dissolved in 100 ml. of carbon tetrachloride, and the resultant solution was cooled to about 0° C. 150 ml. of a solution of 70 g./l. aqueous sodium bicarbonate was then floated on top of the carbon tetrachloride solution. Oxygen containing approximately 0.8% ozone by weight was passed through the two-phase system at a rate of approximately 17 liters per hour over a period of 2 hours. Most of the ozone (approximately 0.14 mole per mole of 2,2'-biphenyldicarboxaldehyde) was absorbed. The carbon tetrachloride layer was drained off in a separatory funnel and the sodium bicarbonate solution was acidified with concentrated hydrochloric acid. This precipitated 10.1 grams (83.5% yield) of 2,2'-diphenic acid, melting in the range 222 to 229° C., which was collected by filtration.

*Example II*

An oxidation was carried out as described above, except that the sodium bicarbonate solution was replaced with 100 ml. of 70 g./l. aqueous sodium-carbonate solution. Upon acidification, 10.7 grams (88.5% yield) of diphenic acid was obtained. The product melted at 222 to 229° C.

*Example III*

2,2'-biphenyldicarboxaldehyde was prepared by the ozonolysis of phenanthrene as described and claimed in a copending application Serial No. 808,554, filed April 24, 1959, now abandoned, by me and another, as follows.

A suspension of 10 grams of purified phenanthrene (0.056 mole) in a mixture of t-butyl alcohol (175 ml.) and water (25 ml.) was treated for one hour with approximately 2.3 weight percent ozone (in oxygen). The ozonization was conducted at room temperature and the gas-flow rate was 102 liters per hour. Under these conditions, 1.15 molecular equivalents (3.1 grams, 0.065 mole) of ozene were passed into the reaction mixture. After the ozonolysis, water (100 ml.) was added to the resultant light yellow solution, and the t-butyl alcohol was removed by distillation until the head temperature reached 95° C. The t-butanol-water azeotrope has the same composition as the starting solvent mixture and it boils at 80° C. The yellow oil which remained after the distillation was then dissolved in 100 ml. of carbon tetrachloride.

The carbon tetrachloride layer was then removed and cooled to about 0° C. An aqueous solution of sodium carbonate (100 ml., 70 g./l.) was then floated on top of the carbon tetrachloride solution. Oxygen containing 0.8% ozone by weight was then passed through the two-phase mixture at a rate of approximately 17 liters per hour for 2 hours, until 0.14 molecular equivalents of ozone per mole of ozonolysis intermediate was absorbed. The carbon tetrachloride layer was then drained off, and the sodium-carbonate layer was acidified with concentrated hydrochloric acid. This precipitated 11.0 grams of 2,2'-diphenic acid (81.0% yield based on phenanthrene) that melted at 218 to 226° C., which was collected by filtration.

*Example IV*

First, 10.5 grams (0.05 mole) of 2,2'-biphenyldicarboxaldehyde was dissolved in 100 ml. of carbon tetrachloride, and the resultant solution cooled to about 0° C. A slurry consisting of 7.0 grams of calcium carbonate in 100 ml. of water was then floated on top of the carbon-tetrachloride solution. Oxygen containing approximately 0.8% ozone by weight was passed through at a rate of approximately 17 liters per hour over a period of 2 hours. Most of the ozone (approximately 0.14 mole per mole of 2,2'-biphenyldicarboxaldehyde) was absorbed. The carbon-tetrachloride layer was drained off in a separatory funnel, and the remaining aqueous slurry was acidified with concentrated hydrochloric acid. This precipitated 10.4 grams of 2,2'-diphenic acid (86% yield), melting in the range 218 to 227° C.

*Example V*

An oxidation is carried out as described above, except that the slurry of aqueous calcium carbonate was replaced with 100 ml. of a 70 g./l. slurry of aqueous magnesium carbonate. Upon acidification, 10.0 grams (82.6% yield) of diphenic acid was obtained. The product melted at 222 to 229° C.

A two-layer system is necessary for the practice of my method and the aqueous layer must be a mildly alkaline solution such as sodium or potassium carbonate. Strong alkali such as sodium hydroxide cannot be used. Other solvents for the dialdehyde may be used in addition to carbon tetrachloride, such as chloroform, methylene chloride and ethylene dichloride. The temperature during oxidation should be kept below 25° C.

It will be evident that the invention provides a simple method for making diphenic acid with good yield from 2,2'-biphenyldicarboxaldehyde which can readily be prepared from an inexpensive starting material, phenanthrene. The invention has the further advantage that but little ozone is required, e.g., 1.3 moles per mole of diphenic acid produced.

Although I have disclosed herein the preferred practice of my invention, I intend to cover as well any change or modification therein which may be made without departing from the spirit and scope of the invention.

I claim:

A method of making diphenic acid comprising dissolving 2,2'-biphenyldicarboxaldehyde in an organic solvent selected from the group consisting of carbon-tetrachloride, chloroform, methylene chloride and ethylene dichloride, floating on said solution water containing about 70 grams per liter of a carbonate of a metal selected from the group consisting of alkali and alkaline-earth metals, then, while said solution and water are at substantially room temperature, passing therethrough oxygen containing about 1% of ozone until about 0.14 mole of ozone per mole of dialdehyde has been absorbed, separating the organic-solvent layer from the water, acidifying the water and collecting the diphenic acid precipitated.

References Cited in the file of this patent

UNITED STATES PATENTS

| | | |
|---|---|---|
| 2,872,480 | Pentz et al. | Feb. 3, 1959 |
| 2,888,485 | Bailey | May 26, 1959 |
| 2,898,350 | Sturrock et al. | Aug. 4, 1959 |